United States Patent [19]

Kjorum et al.

[11] Patent Number: 4,934,027
[45] Date of Patent: Jun. 19, 1990

[54] METHOD OF PULLING-OFF THE HIDE OR SKIN OF ANIMAL CARCASSES

[75] Inventors: Arne Kjørum, Ottestad; Arnold Sjøqvist, Elverum, both of Norway

[73] Assignee: Ameco Hamar A/S, Hamar, Norway

[21] Appl. No.: 308,265

[22] Filed: Feb. 9, 1989

[30] Foreign Application Priority Data

Feb. 11, 1988 [NO] Norway ................................. 880619

[51] Int. Cl.⁵ ............................................. A22B 5/16
[52] U.S. Cl. .............................................. 17/50; 17/21
[58] Field of Search ...................... 17/50, 21, 62, 44.2

[56] References Cited

U.S. PATENT DOCUMENTS

| | | | |
|---|---|---|---|
| 2,871,509 | 2/1959 | Poupet | 17/21 |
| 3,930,284 | 1/1976 | Cook | 17/50 |
| 4,011,630 | 3/1977 | Ochylski | 17/21 |
| 4,021,884 | 5/1977 | Saltyilov et al. | 17/21 |
| 4,164,056 | 8/1979 | Hilgner et al. | 17/21 |
| 4,229,860 | 10/1980 | Irwin | 17/50 |
| 4,751,768 | 6/1988 | Trutillo, Sr. | 17/50 |

Primary Examiner—Willis Little

[57] ABSTRACT

A method and a plant for pulling-off of the hide or skin of animal carcasses, wherein the plant forms part of a slaughtering line in a slaughter-house. The carcasses are transported continuously on a transport path (23, 24) suspended from all four legs in an essentially horizontal position and with the longitudinal direction of the carcass in the movement direction of the transport path. In a lead-in area (1) of the path the rearward legs, as viewed in the transport direction, are retained in relation to the movement of the forward legs, and the carcass (9) thereafter is fed under tension with an essentially constant distance between the suspension points of the forward and rearward legs. After preflaying the hide/skin is pulled off by a stripper means, preferably a rotatable drum (91), which, in a stationary operative position below the back of the carcass (16), executes the stripping operation while the carcass (16) passes the stripper means (91).

13 Claims, 4 Drawing Sheets

METHOD OF PULLING-OFF THE HIDE OR SKIN OF ANIMAL CARCASSES

The present invention relates to a method of pulling-off the hide or skin of animal carcasses, wherein the carcass is transported on a transport path suspended from all four legs in an essentially horizontal position and is moved through a preflaying station and a hide stripping station. Further, the invention relates to a plant for pulling-off the hide or skin of animal carcasses in accordance with the method.

A method of the above-mentioned type is known in connection with a slaughtering line in a slaughterhouse. In the known system the animal carcasses are transported forwards on the transport path while being suspended with their longitudinal direction transversely to the movement direction of the path. For execution of the stripping operation, the transport path has to be stopped when each carcass arrives at the stripping station. With such a system there is not achieved such an effective skin stripping as desirable, neither with respect to rational and rapid operation nor with respect to hygienic and gentle handling of the carcasses.

It is a main object of the invention to provide a method and a plant for pulling-off the hide or skin of animal carcasses which is as hygienic as possibile with respect to the carcass, which gives a gentle handling and thus reduces the possiblities of damage both to carcass and hide/skin, and which also results in a safe operation and simple working operations.

Simultaneously it is an object of the invention to provide a plant giving a high security against accidents, a simple maintenance and cleaning of the plant, and a great flexibility with respect to adaptation to a desired capacity and installation of automatics or auxiliary equipment in the plant.

For achieving the above-mentioned objects, there is provided a method of the introductorily stated type which, according to the invention, is characterized in that the carcass is transported continuously on the transport path with its longitudinal direction in the movement direction of the transport path, the rearward legs, as viewed in the transport direction, in a lead-in area of the path being retained in relation to the movement of the forward legs, and the carcass thereafter being fed under tension with an essentially constant distance between the suspension points of the forward and rearward legs, and that the hide/skin is pulled off by a stripper means which, in operative essentially stationary position below the back of the carcass, executes the stripping operation while the carcass passes said means.

Further, there is provided a plant for pulling-off the hide or skin of animal carcasses, comprising a transport path for transport of the carcass suspended from all four legs in an essentially horizontal position, and a preflaying station and a following hide stripping station below the transport path, which plant is characterized in that the transport path comprises a means for suspension of the carcass so as to be transported continuously with its longitudinal direction in the movement direction of the transport path, and a means for stretching the carcass in a lead-in area of the path and for subsequent feeding of the carcass under tension with an essentially constant distance between the suspension points of the forward and rearward legs, and that the stripping station comprises a stripping means arranged to be brought to an essentially stationary, operative position below the back of the carcass, and to pull off the hide/skin while the carcass is passing said means.

The invention will be further described below in connection with an exemplary embodiment with reference to the drawings, wherein FIG. 1 shows a schematic side view of a plant according to the invention, wherein there is also depicted operators for carrying out different operations during operation of the plant;

Figure 3:
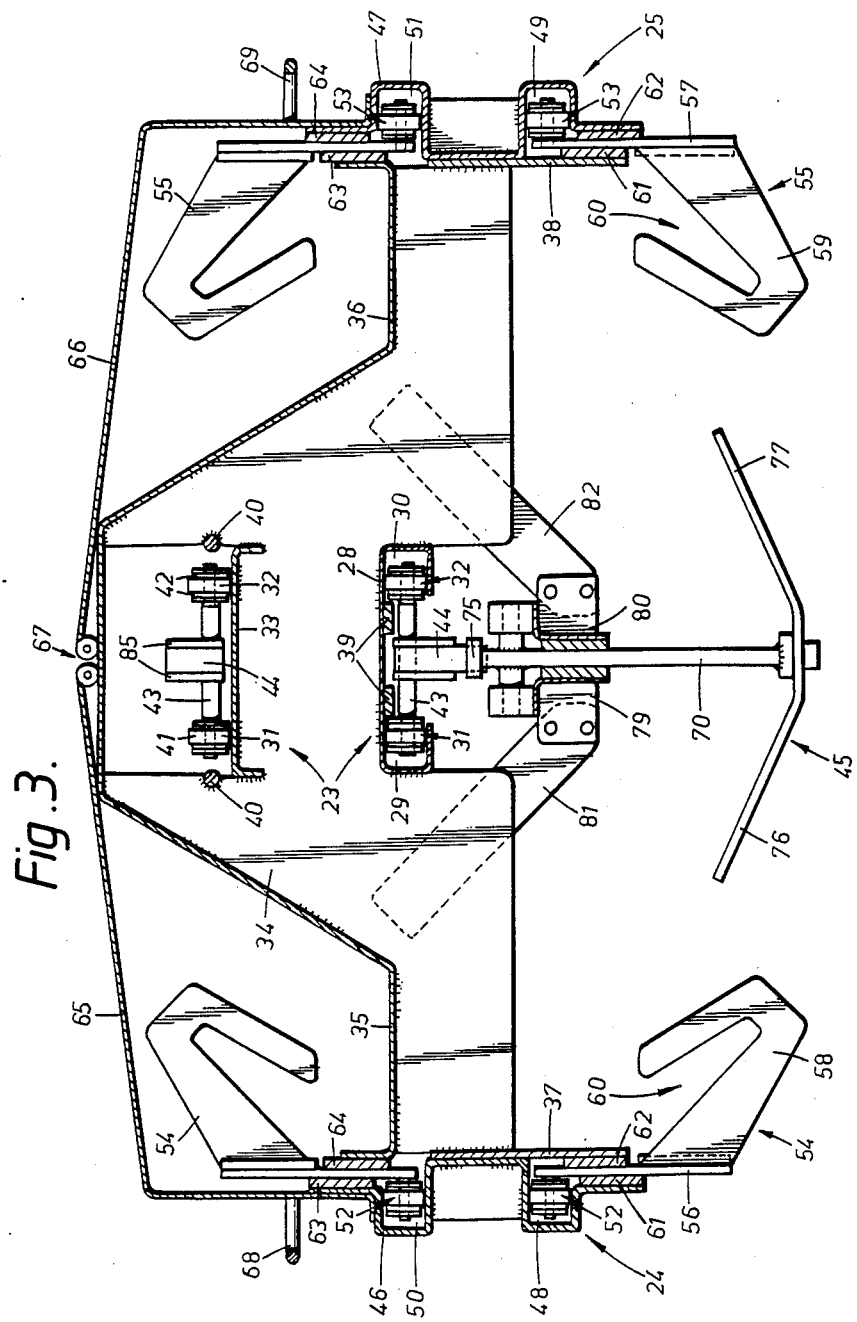
FIG. 3 shows a somewhat simplified section along the line III—III in FIG. 1, and shown on an enlarged scale.
Figure 4:
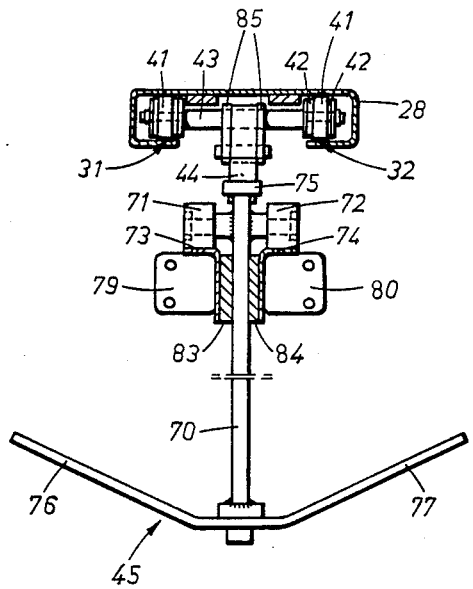
FIG. 4 shows a section of FIG. 3, more specifically the central transport path and a hook means in connection therewith.
Figure 5:
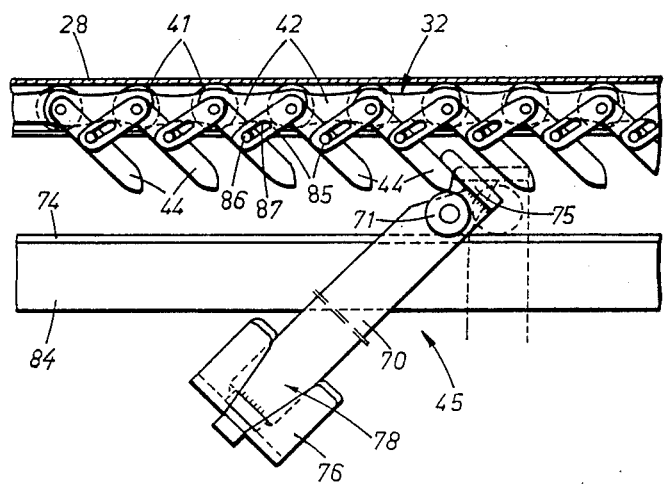
FIG. 5 shows a partly sectional side view of a section of the central transport path, and shows the hook means in FIG. 4 when brought into engagement with a holding means on the transport path.
Figure 6:
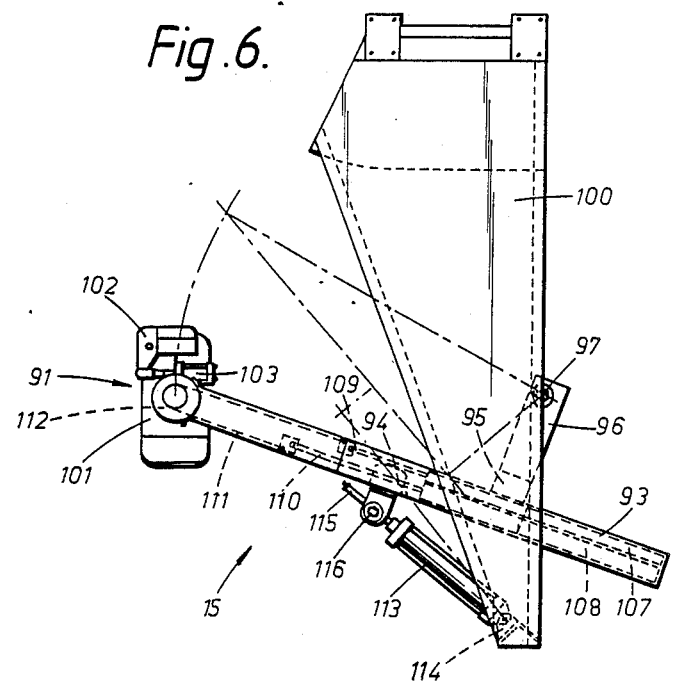
Figure 7:
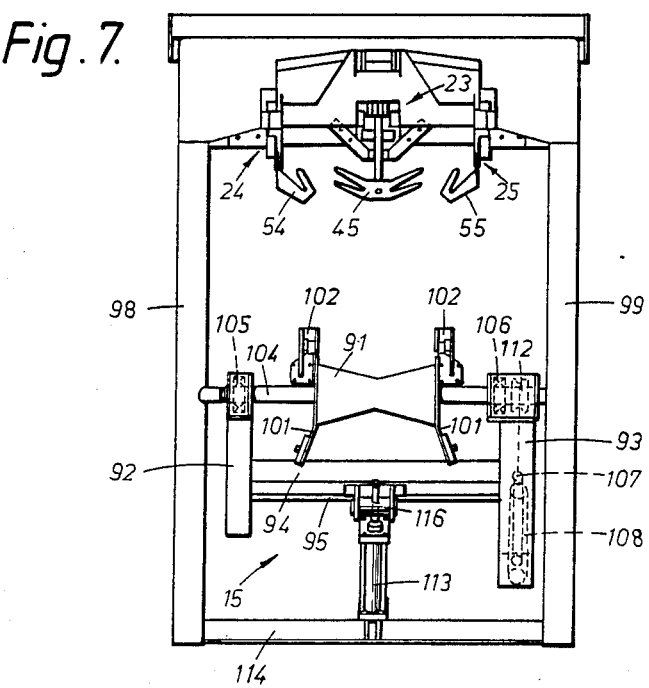

FIG. 6 shows a side view of the stripping station of the plant having a pivotable boom means carrying a stripping means in the form of a rotatable drum, and shown on a reduced scale relation to FIGS. 3-5; and FIG. 7 shows a front view of the stripping station in FIG. 6, the Figure also showing hook means in connection with the central path of the transport path and outer paths on each side thereof.

Figure 1:
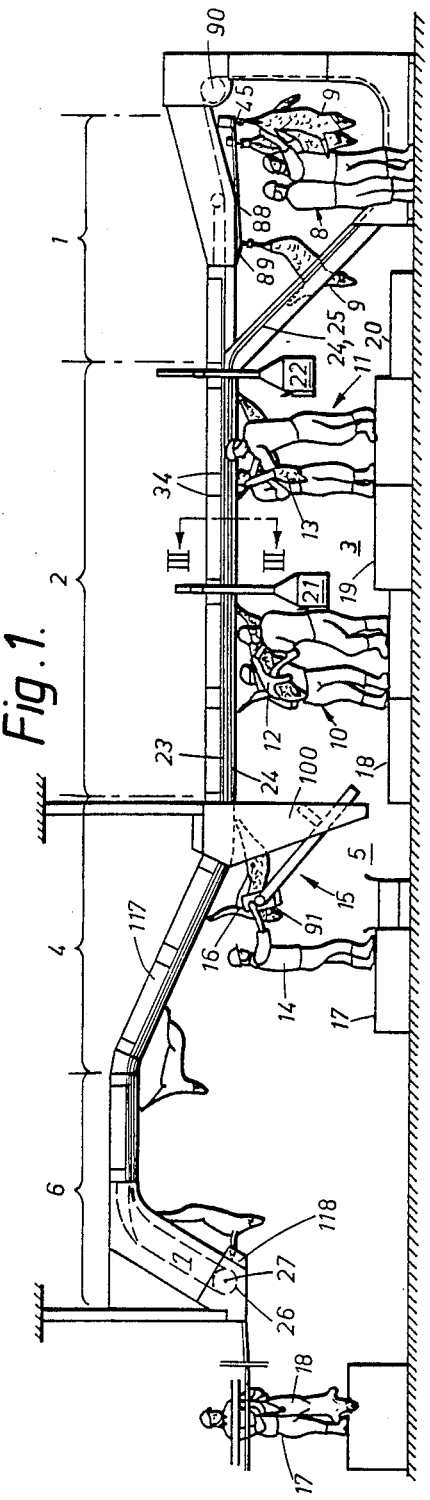

As appears from FIG. 1, the plant according to the invention consists of a transport system with associated working stations for treatment of animal carcasses which are to be flayed in connection with slaughter. In practice the plant will constitute a part of a complete slaughtering line in a slaughterhouse. It may be generally adapted for skin or hide stripping for many different species of animals, but in the illustrated embodiment it is especially intended for sheep and small cattle (calves).

Figure 2:
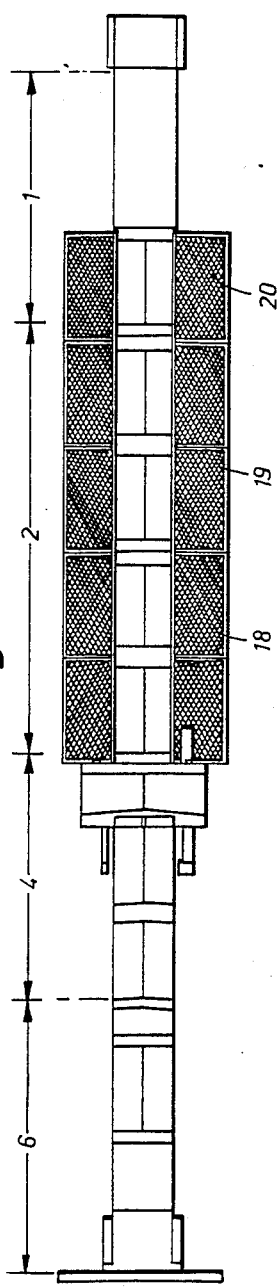
FIG. 2 shows a plant according to FIG. 1 viewed from above.

In FIGS. 1 and 2, the transport system is divided into a lead-in area 1, a horizontally extending path area 2 having a preflaying station 3, an obliquely rising path area 4 having a stripping station 5, and an exit area 6 having a steeply descending path area 7. In FIG. 1 there are further shown a number of operators for executing different operations, as will be further described below in connection with a description of the operation of the plant. More specifically, there are shown two operators 8 carrying out introductory operations on animal carcasses 9 in the lead-in area 1, two pairs of operators 10 and 11, respectively, carrying out preflaying operations on carcasses 12 and 13, and an operator 14 operating the stripper means 15 in stripping of the skin from a carcass 16. At the exit end of the transport path there is shown an additional operator providing for transfer of the flayed carcasses 18 to a subsequent part of the slaughtering line of which the plant forms part.

As shown in FIG. 1, platforms 17, 18, 19, 20 (see also FIG. 2) are arranged for some of the operators, for achieving a suitable working height. On the preflaying station 3 there are shown hanging equipment units 21 and 22 for sterilization and washing, and where the operators can also fetch or place necessary tools and facilities.

Even if, in FIG. 1, there are shown operators for manual execution of the current operations, these operations can, by means of suitable equipment, be carried out more or less automatically, as also further described below.

The general course of the path system appears from FIG. 1, and its constructive structure will be described with reference to FIGS. 3-5.

As shown in FIG. 3, the system in the illustrated embodiment includes a central path 23 and an outer path 24 and 25, respectively, arranged at each side of the central path. The paths consist of endless chains carried in respective guiding means and which, in the illustrated embodiment, are carried over respective sprockets 26 on a common drive shaft 27 (see FIG. 1). In operation, this is driven continuously by a suitable, not further shown, hydraulic drive module arranged at the exit end of the path system.

The path system with associated guiding means are constructed from metall sheets, preferably of stainless steel, which are welded together as shown in FIG. 3. Thus, the central path 23 comprises a lower guiding means in the form of a sheet or plate element 28 which, at its longitudinal side edges, is formed with open channels 29, 30 facing each other, for guiding of respective chains. 31 and 32 in the forward-going transport direction of the path, and an upper guiding means in the form af a sheet or plate 33 for supporting the chains 31, 32 during their return movement along the path. The plates or sheets 28 and 33 are supported and kept in position by means of transversely extending sheets 34 arranged at suitable intervals along the path system. The transverse sheets 34 are in turn welded to longitudinally extending cover sheets 35, 36 arranged at each side of the central path, and to longitudinally extending outer sheets 37, 38 which, together with the transversely extending sheets 34, serve to support the guiding means for the outer paths.

For guiding of the two chains 31, 32 in the lower guiding means, there is arranged, for each chain, a guide rail 39 of a suitable material, preferably a plastics material having a low friction, such as nylon. Similarly, there are arranged guide rods 40 for the chains in the upper guiding means.

The chains 31, 32 may consist of usual hollow bolt chains, preferably of stainless steel, having rollers 41 and chain links 42 which are mounted on the chain bolts (see also FIG. 5). At suitably chosen intervals along their length the chains are connected to each other by means of a group of connecting bolts 43. The connecting bolts carry hook or holding elements 44 for engagement with a special hook means 45 for suspension and transport of the rearward legs of the carcasses as viewed in the transport direction, as further described below. The structure of the hook means 45 and its cooperation with the holding elements 44 will be further described with reference to FIGS. 4 and 5.

The outer paths 24 and 25 of the path system include respective sheet elements 46 and 47, respectively, which are formed with lower and upper guiding means in the form of lower channels 48 and 49, respectively, and upper channels 50 and 51, respectively, for receiving respective chains 52 and 53. The chains are of the same type as the chains in the central path 23. Hook means in the form of fork carriers 54 and 55, respectively, are attached to the chains 52, 53 at fixed, suitably chosen intervals, for the suspension of respective forward legs of the carcasses, as viewed in the transport direction. The hook means consist of plate members 56 and 57, respectively, which are pivotally attached (in a manner not more specifically shown) at one end thereof to the respective chain 52 and 53, respectively, and which are attached at their other end to inwards projecting plate members 58 and 59, respectively, which are each provided with a V-shaped tapering notch 60 for hooking-on of the respective leg of a carcass. For guiding of the hook means 54 and 55, respectively, in the lower and upper guiding means, there are arranged respective lower and upper guide plates 61, 62 and 63, 64, respectively. These are attached respectively to the plate elements 46 and 47 and to the outer sheets or plates 37 and 38, respectively, of the path system, and are suitably made of the same material as the guide rails 39.

As also appears from FIG. 3, the return sections of the central path 23 as well as the outer paths 24 and 25 are covered by sheet or plate covers 65, 66, so that the return sections are located in essentially closed spaces. This is advantageous both for the external appearance and in order to prevent settling of dust and dirt from the outside. The plate covers 65, 66 are hinged by means of an upper hinge means 67, so that the covers when required, for example for cleaning purposes, can be turned up by being lifted at respective handles 68, 69.

The special hook means 45 carried forward on the central path 23 is shown more in detail in FIGS. 4 and 5. The hook means is an essentially inversely T-shaped forked hook having a stem member 70 which is provided at its upper end with a pair of lateral rollers 71, 72 for rolling movement on supporting carrying rails 73, 74, and with a forwards projecting engagement member 75 for engagement with a holding element 44 on a connecting bolt 43, and which is provided at its lower end with lateral fork arms 76, 77 which are each provided with a notch 78 for hooking-on of a leg of a carcass which is to be suspended.

The carrying rails 73, 74 at intervals are supported by carrying elements 79, 80 which, through carrying brackets 81, 82, are attached to the transversely extending sheets 34 of the path system, as shown in FIG. 3. In its movement along the central path, the stem member 70 of the hook means is guided by guide plates 83, 84 attached to respective ones of the carrying rails 73, 74. These guide plates suitably may be made of the same material as the guide plates 61-64.

The holding means for the hook means 45 is shown more in detail in FIG. 5. As shown, the holding means consists of a group of holding arms 44 which are pivotally mounted on associated connecting bolts 43 between pairs of chain rollers 41, each holding arm being kept in position by means of a pair of holding links 85 which, at one end thereof, are connected to a central area of the holding arm 44 by means of a bolt 86, and at its other end are connected to the nearest succeeding connecting bolt 43 or chain bolt.

With their lower free ends the holding arms 44 are adapted to engage with the engagement member 75 of the hook means 45 when the hook means is brought onto the carrying rails 73, 74 in the lead-in area of the path system, as further described below. The hook means then will be brought into engagement with an arbitrary one of the holding arms 44, dependent on the length of the current suspended carcass. In order that the holding arms during this lead-in or insertion phase shall not come into conflict with the engagement member 75, the holding links 85 are provided with a slot 87 allowing movement of the bolts 86, so that the holding arms 44 can be lifted up and pass the engagement member 75.

According to an advantageous feature of the plant according to the invention, the plant is constructed from path modules having a length corresponding to the chain pitch and to the chosen distances between the groups of holding arms 44 along the central path 23. In the illustrated embodiment, which is intended for small cattle and sheep, there may, for example, be used chains having a pitch of 2", i.e. 50,8 mm, and a distance between the holding means (i.e. the holding arm groups) of 100", i.e. 2 540 mm. This gives main modules having a length of 1 270 and 2 540 mm. Curve modules are constructed so that the total dimension is divisible by 2 540 mm.

By means of this arrangement, modules can readily be added with a view to increased path speed and increased plant capacity, or modules can be omitted in case of reduced capacity, so that the total length of the plant can be optimal and as short as possible with the current desired capacity. For example, the modules can be provided with transversely extending sheets 34 at or near each end, as suggested in FIG. 1, and in other respects be arranged for bolting or other suitable interconnection.

As appears from FIG. 1, a separate sloping path 88 is arranged in the lead-in area of the path system, at the upper end of which there arrive carcasses 9 which are suspended from a respective hook means 45. The hook means (with the suspended carcass) then rolls downwards along the sloping path and stops at a stopping means 89 arranged at the lower end of the sloping path, at the entrance to the central path 23. The outer paths 24, 25 of the path system here have an obliquely rising course, the return paths of these paths having been guided downwards from a sprockets means 90 which may be combined with a suitable stretching means (not shown) for the chains of the path. The chain stretching can be effected hydraulically, pneumatically or, if desired, manually. The depending legs of the carcass are attached to respective ones of a pair of passing hook means 54, 55 on the outer paths, so that the carcass is pulled up into horizontal position and is subjected to a gradually increasing tensile force, the hook means 45 with rearward legs being retained by the stopping means 89.

In the embodiment illustrated in FIG. 1 the stopping means 89 simply consists of a short path section which is obliquely rising from the sloping path 88, so that said hook means is retained until the carcass is subjected to a certain tensile force overcoming the movement resistance from the stopping means 89, so that the hook means is released and brought into engagement with a holding arm 44 of the holding means then passing the stopping means. The extension of the holding means and their location on the inner path in relation to the hook means on the outer paths is adapted so that the length variation of the transported carcasses is covered. Since the central and the outer paths are moving with the same speed, the carcass during the further transport will be subjected to an essentially constant tensile force since the distance between the outer hook means and the central hook means remains substantially constant.

The hide or skin stripping means 15 of the plant is shown more in detail in FIGS. 6 and 7. The stripping means comprises a rotatable drum 91 mounted on the forward end, as viewed in the transport direction, of a pivotally mounted boom means consisting of a pair of side booms 92, 93 connected to each other by means of a forward transverse beam 94 and a rearward transverse beam 95. To the rearward transverse beam there are ridgidly attached a pair of upwards directed swing or pivot arms 96 (only one is shown in FIG. 6 and none in FIG. 7) which, at their upper ends, are pivotally mounted on a transversely extending shaft 97 and thus provide for the pivotable mounting of the boom means. The transverse shaft 97 is supported by side frame elements 98, 99 which are attached to and depend at each side of the path system as shown in FIG. 1, the frame elements at the sides thereof being covered by side plates 100.

As appears from FIG. 7, the drum 91 has, in a known manner, a gradually increasing cross-section from its central portion towards the ends. Flange plates 101 are fixed on the ends, and on the outer sides of the flange plates there are mounted pneumatic clips 102 for the fastening of laps of the hide/skin which is to be pulled off (stripped) by winding on to the drum 91. The pneumatic clips are operated by means of pneumatic drive units 103. The drum 91 is fixedly mounted on a shaft 104 journalled at its ends in bearings 105 and 106, respectively, at the forward ends of the booms 92, 93. The drum is driven by a pair of hydraulic cylinders 107, 108 which are mounted within the boom 93 and which, through their piston rods 109, 110, are coupled to the ends of a roller chain 111 which in turn runs over a sprocket 112 on the drum shaft 104. The drum is driven by means of hydraulic cylinders to rotate in a fixed cycle and to achieve a fixed position of the skin clips 102 in the fastening of the skin laps. The two cylinders 107, 108 have different diameters for achieving a faster rotation of the drum when returning to the initial position then when rotating in the pulling-off direction. The number of revolutions of the drum in each direction for example may be chosen equal to three, but can be changed by changing cylinder lengths or sprocket size.

The boom means is moved by means of a pneumatic cylinder 113 which, at its lower end, is pivotally supported by a lower frame beam 114 between the frame elements 98, 99, and of which the piston rod 115 is coupled to a slide mounting 116 attached to the forward transverse beam 94. A slide mounting is used for achieving a "floating" movement of the drum during the stripping operation, as will be further described below in connection with the description of the operation of the plant.

As shown in FIG. 1 and described above, the path system has an obliquely rising path area 4 after the stripping means 15. The slope of the path section 117 in this area is chosen so that a straight line through the axis of the drum 91 and the bearing or mounting point 97 of the boom means during the stripping operation proper preferably is essentially parallel with the movement direction of the carcass 16 on the sloping path section. This has been found to give optimal pulling-off or stripping conditions, both with respect to relative adaptation between the movements of the stripping means and the carcass and with respect to effective and gentle skin stripping. At the same time there is obtained a hygienic advantage in that the carcass moves upwards and away from the skin, the risk for possible contact between the flayed carcass and the skin then being eliminated.

The rising path section 117 also is advantageous for achieving the shortest possible path and furthermore a sufficiently large path elevation before the steeply descending path section 7 in the exit area 6. The path section 7 has as its function to transfer the carcasses to a vertical position while still being stably suspended from the hook means. At the lower end of the path section there is mounted a means 118 for automatic cutting-off of the forward legs, as viewed in the transport direction (normally the forelegs, as shown in FIG. 1) of the arriving carcass. During this cutting-off the carcass hangs in a substantially vertical position, so that the cutting-off can take place without the carcass flinging and coming into contact with a subsequent carass.

A description of the operation of the plant according to the invention will be given below.

Before the animal carcasses arrive at the lead-in area 1 of the plant, they pass a so-called bleeding path where the carcasses during the bleeding hang from the hindlegs, and with the hooves on, in the hook means 45. This path has a continuous drive, and the carcasses are fed (carried forward) with a suitable speed for the attainment of a desired capacity, and with a constant distance between the carcasses.

In the lead-in area 1 the initial preflaying operations are carried out in that an operator 8 makes an incision in the hide/skin backwards from the brest and upwards along thigh and calf to the hooves and around the calf on both legs. Thereafter the carcass 9 is moved along the sloping path 88 forwards to the stopping means 89. In the stopping position the forelegs of the carcass are attached either manually or automatically to a pair of hook means 54, 55 on the outer paths 24, 25, whereafter the carcass by the movement of the hook is pulled up to a horizontal position hanging from all four legs. The carcass is stretched in the manner described above by means of the cooperation between the hook means 45, 54, 55, the stopping means 89 and the holding arms 44 in the holding means passing on the central path 23, whereafter the carcass in the stretched condition is inserted in the preflaying station 3 with a speed which is dependent on the distance between each carcass on the bleeding path and the distance between the forelegs of two succeeding carcasses in the horizontal position, together with the desired plant capacity.

On the preflaying station 3 the necessary preflaying of brest and forelegs is carried out, either manually (as shown) or mechanically by means of so called guides during the feeding. The amount of preflaying depends on the type of animal and the method used, and the length of the preflaying station is dependent on the capacity. By means of the modular structure of the path system, the capacity can, as mentioned, be increased or reduced by addition or removal of modules. A mechanical preflaying with a guide system may be controlled manually, mechanically by means of impulses directly from the carcass, or electronically by means of a computer.

The operation of the skin stripper means 15 on the stripping station 5 is controlled directly by the arriving carcass 16 by means of an impulse from the path when the carcass has arrived at a certain position, for example in that a foreleg hook passes a suitable switch or sensor. This impuls starts a cycle including the following operations: - The boom means with the drum 91 is lifted by means of the pneumatic cylinder 113 to a position wherein the drum is located beneath the neck of the animal. - The preflayed hide from the forelegs (or the hindlegs in case these are leading in the transport direction) is inserted manually or mechanically in the clips 102 which thereafter clamp the hide lap. - The drum 91 starts its rotation at the same time as the lifting means 113 is disconnected and only functions as a damper. As a result of the movement of the carcass and the rotation of the drum the hide/skin is wound onto the drum at the same time as the drum is "floating" and follows the outer shape of the animal, the drum being kept in position against the underside of the carcass only by the hide/skin which is being wound onto the drum. - When the pulling-off (stripping) is finished, the boom means with the drum falls down to the initial position at the same time as the drum rotates in the oposite direction and delivers the hide/skin. When the drum has returned to the initial position, the stripping means is ready to receive an impulse from the next following carcass, for the start of another cycle.

During the stripping operation the carcass is moved upwards along the path section 117, so that the risk of possible contact between the flayed carcass and the unrolled hide is eliminated.

When the carcass has been transported to the exit area and the forward, lower legs has been cut off at the lower end of the steeply descending path section 7, the carcass is moved out from the plant and into a re-hooking station wherein the carcass 18 is suspended from a fresh hook, either mechanically or by an operator 17, as suggested in FIG. 1. The carcass thereafter is transported further to additional treatment stations on the slaughtering line.

In the foregoing description it is presupposed that the carcasses are transported in the path system with the head and forelegs ahead. Even if this is preferred, there is in principle nothing to prevent that the carcasses are fed with the hindlegs ahead in the transport direction.

As regards the hydraulic aggregate for the operation of the skin stripping means and other mechanically driven means of the plant, this may suitably be mounted at the exit end of the plant together with the drive module for the operation of the transport chains. As a standard there is chosen a duplex pump having an adjustable delivery quantity for the setting of a desired speed of transport chains and stripping drum. There may also be used a triplex pump if it is also desirable to have a hydraulic operation of the bleeding and slaughtering paths.

Even if the tripping means in the illustrated embodiment is a rotatable drum, it may also consist of other means, for example a pair of chains which are stationarily fixed at one end thereof and at their other ends are provided with suitable hooks for hooking-on in the preflayed laps of the skin/hide. However, a rotatable drum of the shown design is particularly advantageous for achieving a safe and gentle stripping.

We claim:

1. In a method of stripping the hide or skin of animal carcasses of the type where the carcasses are transported on a conveyor means suspended from all four legs in an essentially horizontal position and moved through a prestripping station and a final hide/skin stripping station, with their longitudinal direction in the movement direction of the conveyor means, the steps comprising: transporting several carcasses simultaneously and continuously along said conveyor means; retaining the rearward legs of each arriving carcass, as viewed in the transport direction, in a lead-in area of the conveyor means in relation to the forward legs; thereafter feeding each of the carcasses under tension with an essentially constant distance between the suspension points of the forward and rearward legs; and pulling off the hide/skin by a stripping means which, in operative essentially stationary position below the back of the carcass in question, executes the stripping operation while the carcass passes said stripping means.

2. A method according to claim 1, and the step of transporting the forward and rearward legs of the carcasses on respective tracks driven with the same speed.

3. A method according to claim 1 or 2, wherein the stripping means is a rotatable drum, and the step of maintaining the drum, during the stripping operation, in a floating position against the back of the carcass in question by the hide/skin wound onto the drum while the carcass is passing thereby.

4. A system for hide/skin stripping of animal carcasses, comprising a conveyor means (23, 24, 25) for continuous transport of carcasses (12, 13, 16), a prestripping station (3) and a following final hide/skin stripping station (5) below the conveyor means (23, 24, 25), said conveyor means (23, 24, 25) comprising means (45, 54, 55) for suspension of the carcasses (12, 13, 16) from all four legs in an essentially horizontal position and with their longitudinal direction in the movement direction of the conveyor means, and a tensioning means (89, 44, 45, 54, 55) for tensioning each arriving carcass in a lead-in area (1) of the conveyor means and for subsequently feeding each of the carcasses under tension with an essentially constant distance between the suspension points of the forward and rearward legs, and said stripping station (5) comprising a stripping means (91) arranged to be brought to an essentially stationary, operative position below the back of each arriving carcass (16), and to pull off the hide/skin while the carcass in question is passing said stripping means.

5. A system according to claim 4, wherein said conveyor means comprises a central track (23) for carrying forward a plurality of first hook means (45) for suspension of the rearward legs of respective carcasses, as viewed in the transport direction, and an outer track (23 resp. 25) arranged on each side of said central track (23) and being provided at fixed intervals with pairs of second hook means (54, 55) for suspension of respective ones of the forward legs of the carcasses as viewed in the transport direction.

6. A system according to claim 5, wherein said lead-in area (1) of said conveyor means includes a separate sloping track (88) on which each of said first hook means (45), with a carcass (9) suspended therefrom, moves forward to a stopping means (89), a respective pair of said second hook means (54, 55) of said outer tracks (24, 25), after the depending legs of the carcass (9) in question having been attached thereto, causing by its continuous movement a gradual tensioning of the carcass until said first hook means (45), with a certain tensile force thereon, is released from said stopping means (89) and engages with a holding means (44) on said central track (23).

7. A system according to claim 6, wherein said holding means comprises a group of holding elements (44) arranged at intervals on said central track (23), one such group being arranged at a chosen distance behind each said pair of said second hook means (54, 55) of said outer track (24, 25).

8. A system according to claim 7, wherein each of said first hook means (45) is substantially inversely T-shaped with a stem member (70) which is provided at its upper end with a pair of lateral rollers (71, 72) for rolling movement on supporting carrying rails (73, 74), and with a forwardly projecting engagement member (75) for engagement with a holding element (44) of said holding means, and is provided at its lower end with lateral arms (76, 77) having notches (78) for releasable retention of respective legs of the carcasses.

9. A system according to claims 4, 5, 6, 7 or 8, wherein said stripping means is a rotatable drum (91) mounted on the forward end, as viewed in the transport direction, of a pivotally mounted boom means (92, 93), a lifting means (113) being coupled to said boom means and arranged to raise said drum (91) to its operative position by swinging said boom means (92, 93), said lifting means being disconnected during the stripping operation, so that said drum (91) is maintained in a floating position by the hide/skin wound onto said drum.

10. A system according to claim 9, wherein said drum (91) is fixedly mounted on a rotatable shaft (104) which, through a sprocket and chain means (111, 112), is coupled to a hydraulic cylinder means (107, 108) mounted on said boom means (93) for rotation of said drum (91) from a fixed initial position in the stripping direction and in the opposite direction back to the initial position.

11. A system according to claim 10, wherein said conveyor means on said stripping station (5) passes into an obliquely rising conveyor section (117), a generally straight line through the drum axis (104) and the bearing point (97) of said boom means (92, 93) during the stripping operation preferably being substantially parallel with the movement direction of the carcasses (16) on said rising conveyor Section (117).

12. A system according to claim 11, wherein said conveyor means, after said rising conveyor section (117), is formed with a steeply descending conveyor section (7) bringing the carcasses from a horizontally to a vertically hanging position, and release means (118) provided at the end of said descending conveyor section (7) for release of the lower legs of the carcasses, so that the carcasses in the vertical position are hanging suspended from only the upper legs.

13. A system according to any of the claims 4, 5, 6, 7, 8, wherein said conveyor means (23, 24, 25) is constructed from modules having a certain length determined by the construction and speed of conveyor means, and by a desired system capacity, said modules being able to be removed or added as needed to accommodate changed conveyor speed and system capacity.

* * * * *